(12) United States Patent
Jackson (10) Patent No.: US 7,077,056 B2
(45) Date of Patent: Jul. 18, 2006

(54) JUICE EXTRACTOR WITH ORIFICE TUBE BEAM MOVABLE BETWEEN OPERATING AND MAINTENANCE POSITIONS AND ASSOCIATED METHODS

(75) Inventor: Mark Jackson, Auburndale, FL (US)

(73) Assignee: FMC Technologies, Inc., Chicago, IL (US)

( * ) Notice: Subject to any disclaimer, the term of this patent is extended or adjusted under 35 U.S.C. 154(b) by 189 days.

(21) Appl. No.: 10/654,745

(22) Filed: Sep. 4, 2003

(65) Prior Publication Data

US 2005/0051039 A1    Mar. 10, 2005

(51) Int. Cl.
*A47J 19/02* (2006.01)
*B30B 9/06* (2006.01)

(52) U.S. Cl. ............................ 99/513; 99/508; 99/507; 99/495; 100/37; 100/98 R; 100/108; 100/213

(58) Field of Classification Search ................ 99/495, 99/510, 508, 509, 511, 512, 513, 507; 100/98 R, 100/108, 213, 37, 245

See application file for complete search history.

(56) References Cited

U.S. PATENT DOCUMENTS

| | | | |
|---|---|---|---|
| 2,649,730 A | * | 8/1953 | Hait .......................... 100/37 |
| 2,780,988 A | | 2/1957 | Belk et al. |
| 3,236,175 A | | 2/1966 | Belk |
| 4,951,563 A | * | 8/1990 | Warren et al. ............... 100/111 |
| 5,771,539 A | * | 6/1998 | Wahlstedt et al. ............. 16/285 |
| 5,996,485 A | * | 12/1999 | Suter et al. .................... 100/37 |
| 6,568,319 B1 | | 5/2003 | Schrader et al. ............ 100/108 |

* cited by examiner

*Primary Examiner*—Reginald L. Alexander
(74) *Attorney, Agent, or Firm*—Allen, Dyer, Doppelt, Milbrath & Gilchrist, P.A.

(57) ABSTRACT

A juice extractor includes pairs of opposing cups being relatively movable for squeezing fruit therebetween. The juice extractor may also include a pair of drive members extending along opposite sides of the pairs of opposing cups, a plurality of strainer tubes associated with respective pairs of opposing cups, and an orifice tube beam having opposing ends slidable along medial portions of respective drive members. A plurality of orifice tubes may extend from the orifice tube beam for reciprocal movement within respective strainer tubes. The juice extractor may also include a pair of orifice tube beam locks for selectively locking the orifice tube beam to the medial portions of the respective drive members, and a lift assist for moving the orifice tube beam between a lower maintenance position and an upper operating position.

21 Claims, 11 Drawing Sheets

JUICE EXTRACTOR WITH ORIFICE TUBE BEAM MOVABLE BETWEEN OPERATING AND MAINTENANCE POSITIONS AND ASSOCIATED METHODS

FIELD OF THE INVENTION

This invention relates to the field of juice extractors and, more particularly, to the field of maintenance for juice extractors and related methods.

BACKGROUND OF THE INVENTION

A known FMC Technologies juice extractor is disclosed in U.S. Pat. No. 2,649,730 to Hait, and assigned to the present assignee, the disclosure of which is hereby incorporated by reference in its entirety. In this vertically arranged juice extractor, upper and lower cups support a fruit, vegetable or similar product. The sides of both upper and lower cups have fingers that interdigitate together. The upper cup descends into the lower cup against the fruit or vegetable and is pressed against a circular, lower cutter positioned at the top of a strainer tube adjacent the lower cup and an upper cutter positioned in the upper cup. Plugs are cut into the top and bottom portions of the fruit as the interdigitating fingers of the two cups mesh together. Inner portions of the fruit, such as the pulp and juice, are forced down into the strainer tube positioned within a manifold.

An orifice tube moves upward in the strainer tube and applies pressure into the internal portion of the strainer tube to separate juice and pulp within the strainer tube. Juice and juice sacks flow through holes of the strainer tube into a juice manifold. Those internal portions of the fruit having particle sizes larger than the holes in the strainer tube are forced through a discharge opening in the orifice tube and then discharged.

The juice extractor disclosed in the Hait '730 patent includes a pair of drive members, an orifice tube beam that is slidable along the drive members, and an end member carried by lower ends of the drive members. More specifically, the orifice tube beam is moveable between an upper operating position and a lower maintenance position. When in the upper operating position, the weight of the orifice tube beam is supported by hinged arms that, in turn, include lower ends carried by the end member. During operation, the force generated by the reciprocal movement of the drive members may result in fatigue and failure of the end member near the hinges. A similar juice extractor is disclosed in U.S. Pat. No. 2,780,988 to Belk et al.

Another shortcoming of this prior juice extractor is that a handle to move the orifice tube beam between lower and upper positions relies on rotation of the lower end member to thereby cause movement of the hinges. This may not give sufficient leverage to a technician.

SUMMARY OF THE INVENTION

In view of the foregoing background, it is therefore an object of the present invention to provide a juice extractor having greater reliability and/or that is more easily moved between lower and upper positions.

These and other objects, features, and advantages of the present invention are provided by a juice extractor comprising orifice tube beam locks to selectively lock an orifice tube beam to medial portions of respective drive members. More specifically, the juice extractor may comprise pairs of opposing cups being relatively movable for squeezing fruit therebetween, a pair of drive members extending along opposite sides of the pairs of opposing cups, and a plurality of strainer tubes associated with respective pairs of opposing cups.

The juice extractor may also comprise an orifice tube beam having opposing ends slidable along medial portions of respective drive members, and a plurality of orifice tubes extending from the orifice tube beam for reciprocal movement within respective strainer tubes. The pair of orifice tube beam locks may be included to selectively lock the orifice tube beam to the medial portions of the respective drive members.

Each of the drive members may have a recess at a medial portion thereof. Each of the orifice tube beam locks may comprise at least one key member and a lock handle cooperating therewith for moving the key member between a locked position engaged within the recess and an unlocked position disengaged from the recess.

Each drive member may further comprise a respective stop above the end of the orifice tube beam. The recess and the key member may have cooperating inclined portions to preload the orifice tube beam against the stop when the key member is moved from the unlocked position to the locked position.

Each of the orifice tube beam locks may further comprise a tubular body surrounding the medial portion of a respective drive member, a pair of spaced apart flanges carried by the tubular body, and a U-shaped bracket transversely slidable on the tubular body between the spaced apart flanges. The U-shaped bracket may carry a key member. Each orifice tube beam lock may also comprise a cam rotatably carried by opposing ends of the U-shaped bracket and connected to the lock handle. The juice extractor may also include an adjustable spacer associated with each orifice tube beam lock.

The juice extractor may still further comprise an end member connected between opposing ends of the pair of drive members, and a lift assist connected between the end member and the orifice tube beam for moving the orifice tube beam between a lower maintenance position and an upper operating position.

The lift assist may comprise a pair of hinges extending between the end member and the orifice tube beam, and at least one spring connected to the hinges to urge the orifice tube beam to the upper operating position. This advantageously decreases the load that an operator would normally lift to move the orifice tube beam to the upper position.

Each hinge may comprise a lower arm having a lower end pivotally mounted to the end member. Each hinge may further comprise an upper arm having an upper end pivotally connected to the orifice tube beam, and a lower end pivotally connected to a medial portion of the lower arm. The lift assist may also comprises a lift assist handle connected between upper ends of the lower arm.

A method aspect of the present invention is for selectively locking an orifice tube beam of the juice extractor described above in an operating position. The method may comprise selectively locking a pair of orifice tube beam locks to medial portions of the drive members to thereby selectively lock the orifice tube beam in the operating position.

Another method aspect of the present invention is for moving an orifice tube beam of a juice extractor, as described above, between a lower maintenance position and an upper operating position. The method may comprise installing a lift assist to the juice extractor, and grasping and raising the lift assist handle to move the orifice tube beam from the lower maintenance position to the upper operating position.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
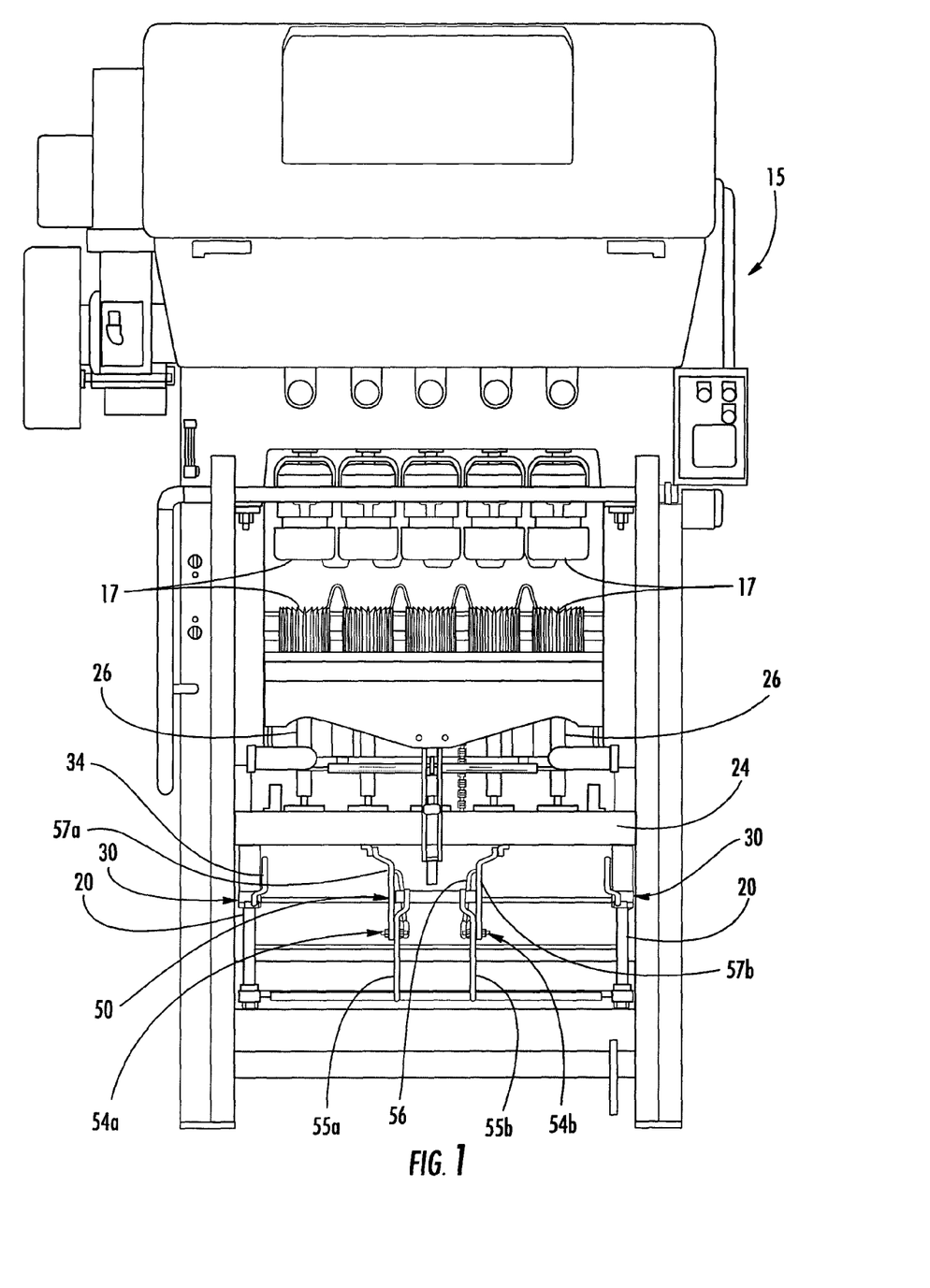
FIG. 1 is front elevation view of a juice extractor according to the present invention.

Referring initially to FIG. 1, a juice extractor 15 according to the present invention is now described. The juice extractor 15 illustratively includes a pair of orifice tube beam locks 30 to lock an orifice tube beam 24 along medial portions of drive members 20. Accordingly, the orifice tube beam locks 30 of the juice extractor 15 are advantageous in sustaining the load of the orifice tube beam 24 when reciprocated in an upper operating position. The juice extractor 15 also illustratively includes a lift assist 50 for moving the orifice tube beam 24 between a lower maintenance position and the upper operating position.

The juice extractor 15 also illustratively includes pairs of opposing cups 17 that are relatively movable for squeezing fruit therebetween. The juice extractor 15 further includes a pair of drive members 20 extending along opposite sides of the pairs of opposing cups 17, and a plurality of strainer tubes (not shown) associated with the opposing cups.

The juice extractor 15 also comprises an orifice tube beam 24 having opposing ends slidable along medial portions of the drive members 20, and a plurality of orifice tubes 26 extending from the orifice tube beam for reciprocal movement within the strainer tubes. Accordingly, after fruit has been squeezed between the opposing cups 17, juice is passed through the strainer tubes and collected in a manifold (not shown).

Figure 2:
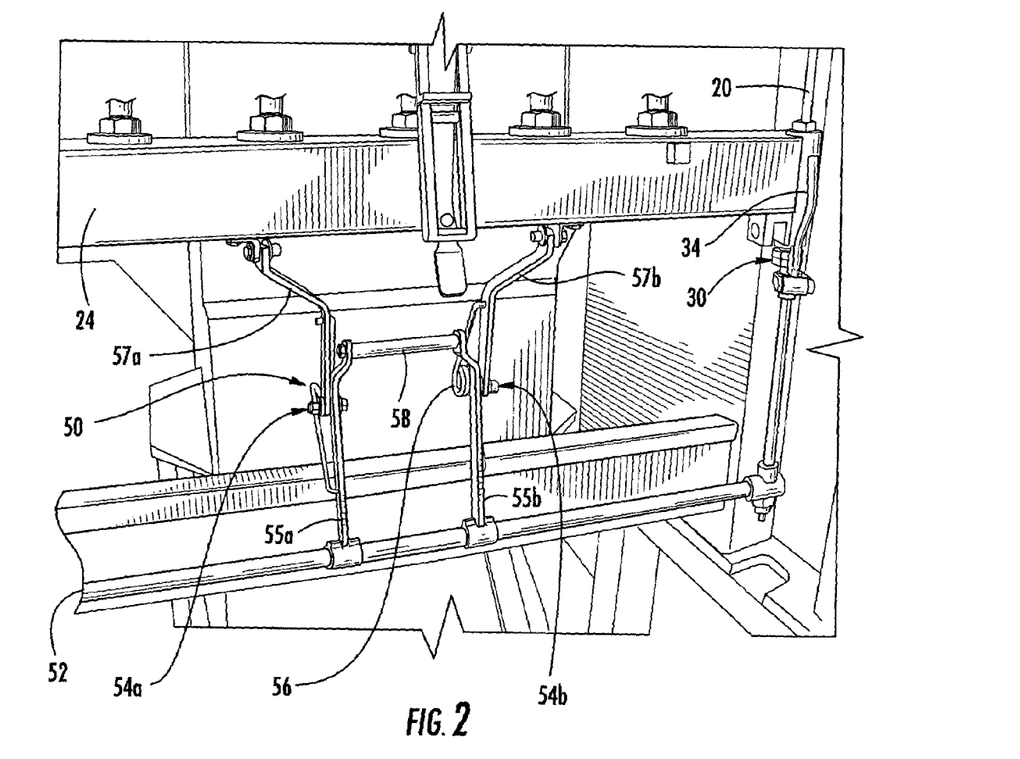
FIG. 2 is a perspective view of a portion of the juice extractor shown in FIG. 1 with an orifice tube beam in the upper position, and a lock handle in the locked position.
Figure 3:
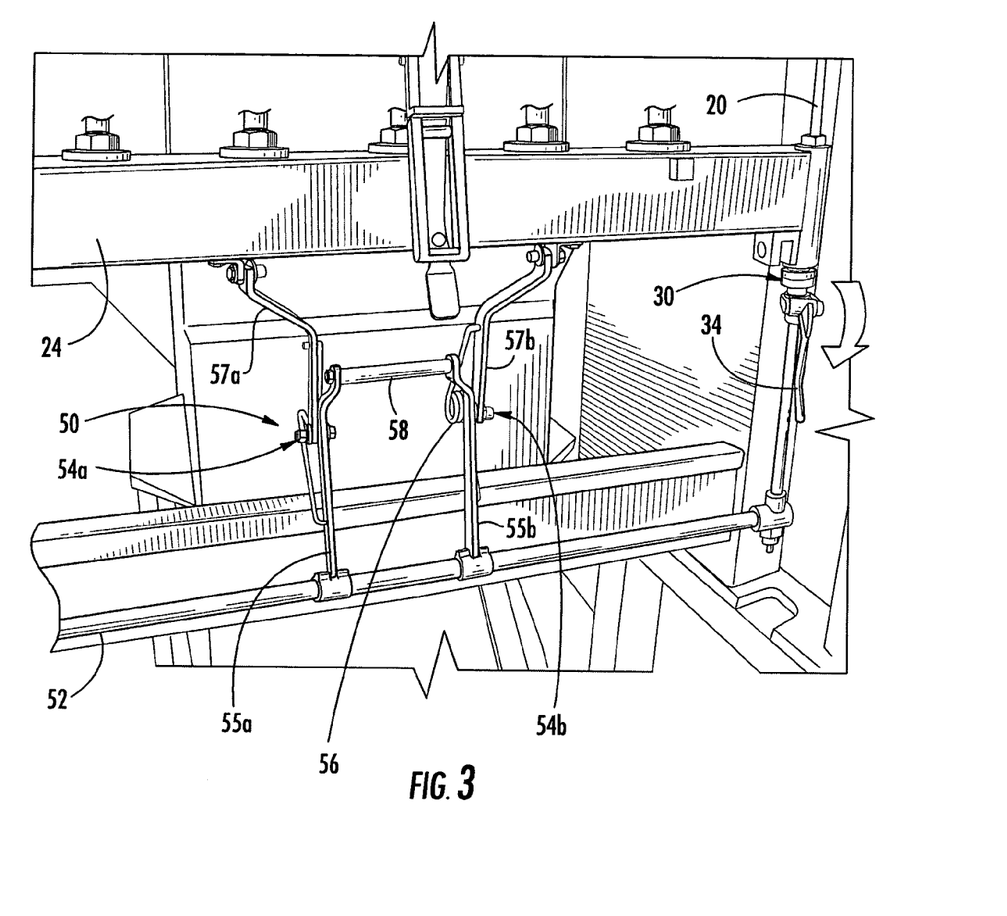
FIG. 3 is a perspective view of a portion of the juice extractor shown in FIG. 1 with the orifice tube beam in the upper position, and the lock handle in the unlocked position.
Figure 4:
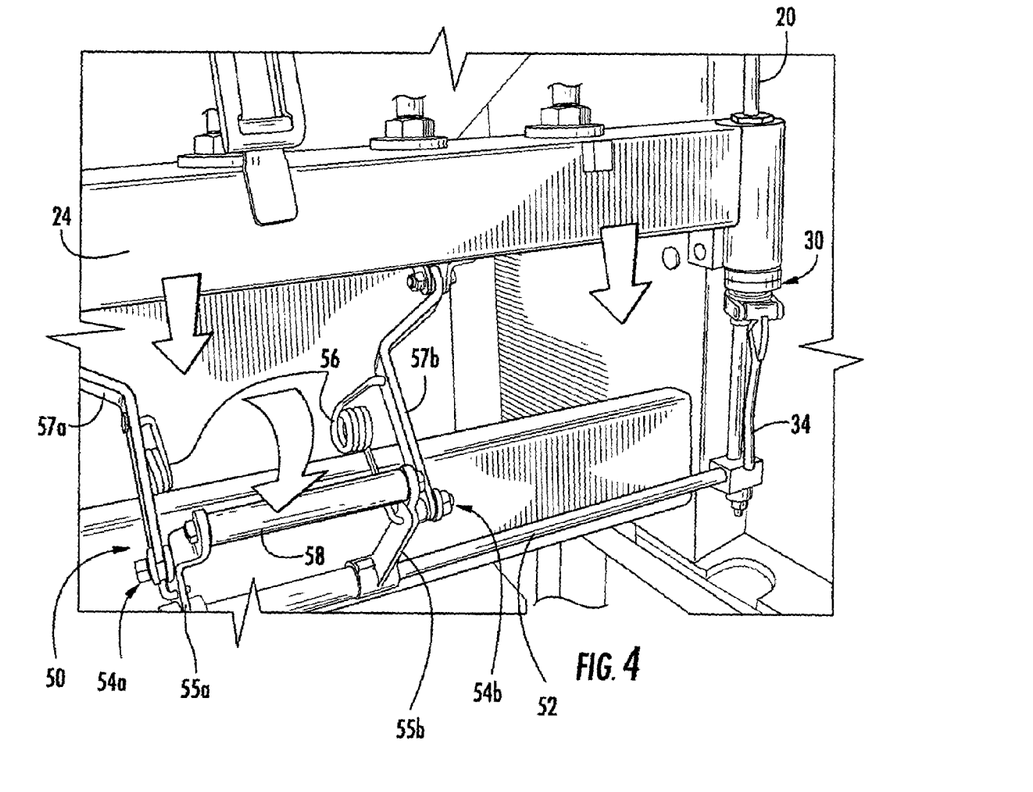
FIG. 4 is a perspective view of the juice extractor shown in FIG. 1 with the orifice tube beam being moved to a lower position.
Figure 5:
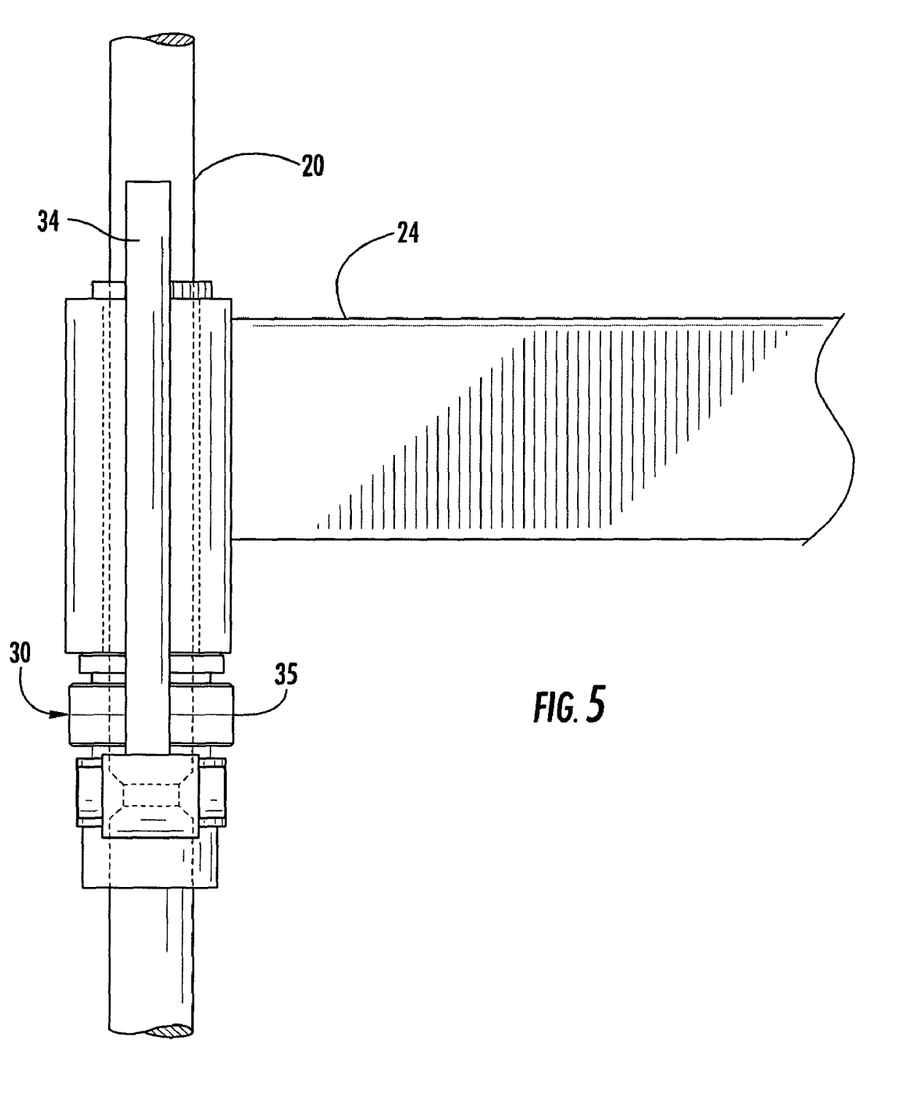
FIG. 5 is a front elevational view of an orifice tube beam lock on a drive member of the juice extractor shown in FIG. 1.

Turning now additionally to FIGS. 2–4, the lift assist 50 of the juice extractor 15 is now described in more detail. An end member 52 is illustratively connected between opposing ends of the pair of drive members 20. The lift assist 50 is connected between the end member 52 and the orifice tube beam 24 for moving the orifice tube beam between a lower maintenance position (FIG. 4) and an upper operating position (FIG. 3). The lift assist 50 comprises a pair of hinges 54a, 54b extending between the end member 52 and the orifice tube beam 24, and springs 56 connected to the hinges to urge the orifice tube beam to the upper operating position.

Each of the hinges 54a, 54b includes a lower arm 55a, 55b having a lower end pivotally mounted to the end member 52. The hinges 54a, 54b also includes upper arms 57a, 57b having upper ends pivotally connected to the orifice tube beam 24, and lower ends pivotally connected to a medial portion of the lower arms. The lift assist 50 further comprises a lift assist handle 58 connected between upper ends of the lower arms 55a, 55b. The lift assist 50 does not rely on rotation of the end member 52 as in the prior art. Rather, lifting and locking of the hinges 54a, 54b is more efficiently provided in accordance with this aspect of the extractor 15.

Turning now additionally to FIGS. 5–10c, the orifice tube beam locks 30 of the juice extractor 15 of the present invention are now described in greater detail. The pair of orifice tube beam locks 30 are for selectively locking the orifice tube beam 24 to the medial portions of the respective drive members 20. The configuration of the orifice tube beam locks 30 advantageously allow the orifice tube beam 24 to be supported along the medial portion of the drive members 20 when in the upper position.

Figure 8A:
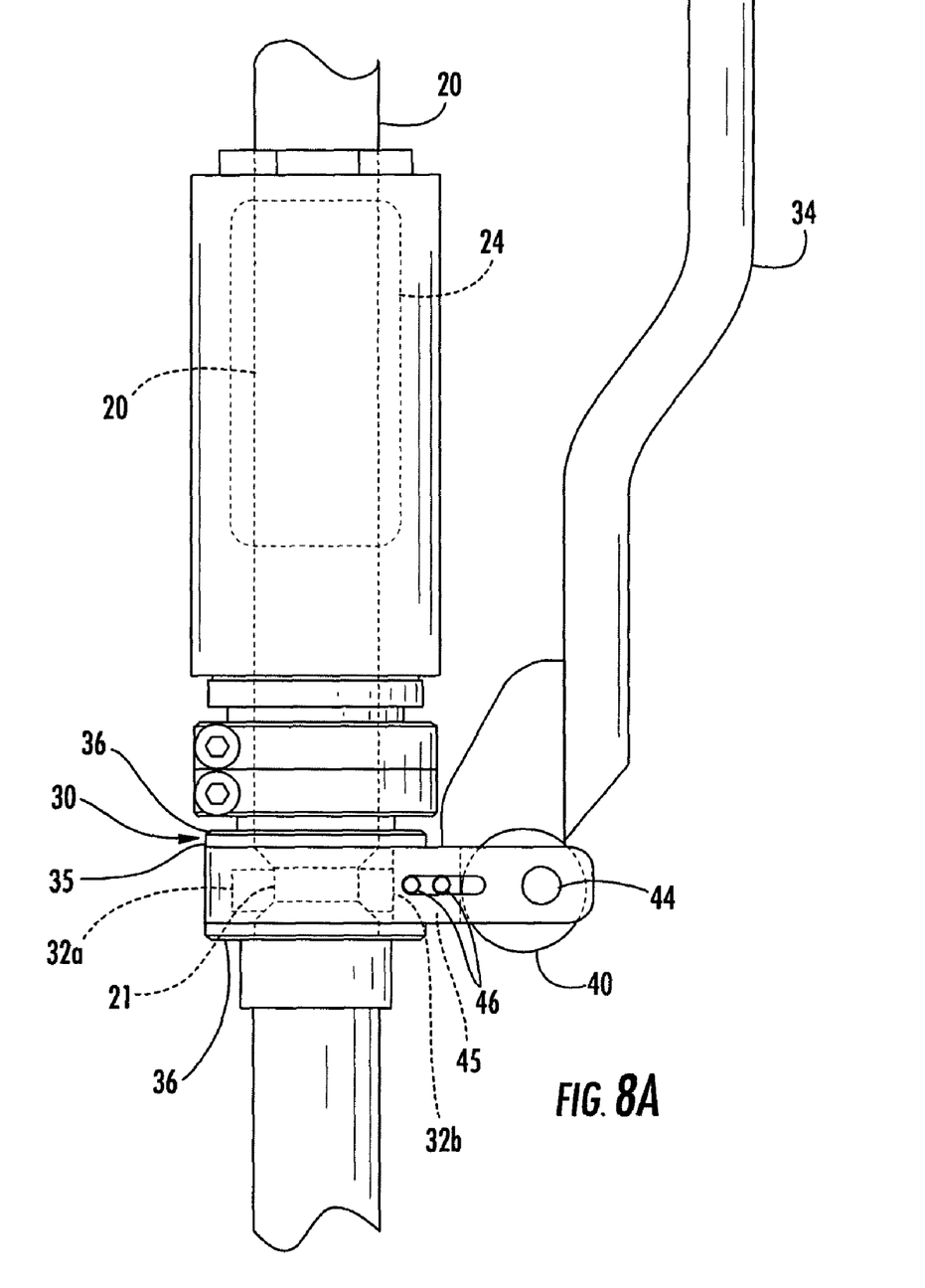
FIGS. 8A–8B are side elevational views of the orifice tube beam lock shown in FIG. 7 having the lock handle in the locked position with the orifice tube beam lock being engaged (FIG. 8A) and being moved to the unlocked position with the orifice tube beam lock being disengaged (FIG. 8B).
Figure 8B:
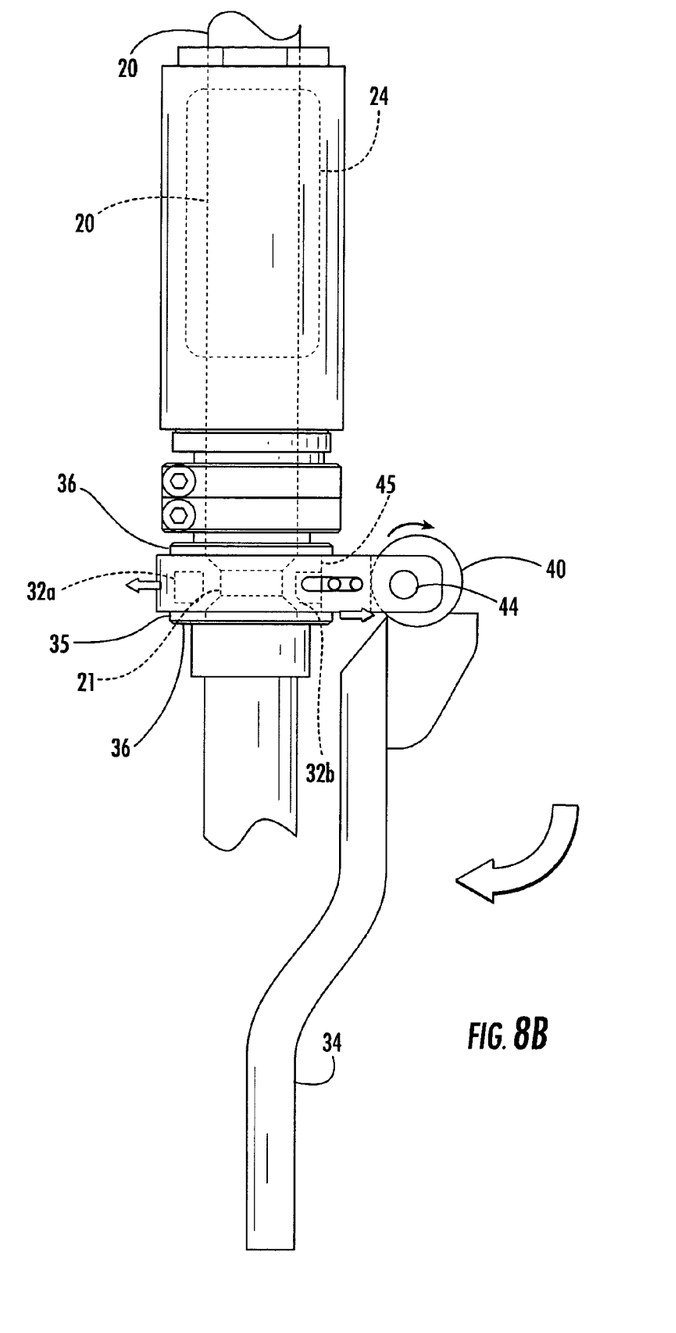
Figure 9A:
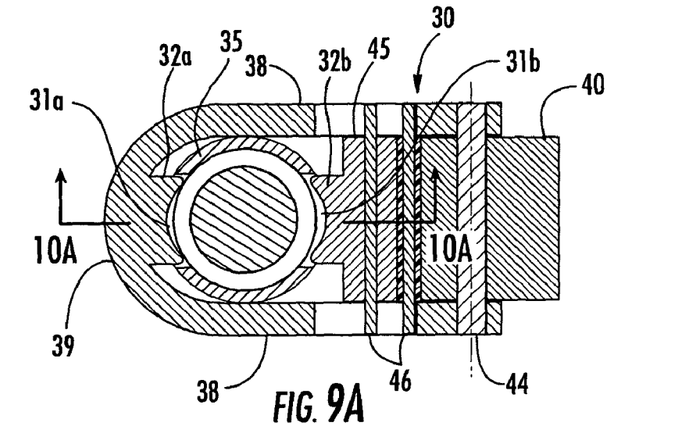
FIGS. 9A–9C are lateral cross-sectional views through the center of the orifice tube beam lock of the juice extractor shown in FIG. 1 during stages of locking.
Figure 9B:
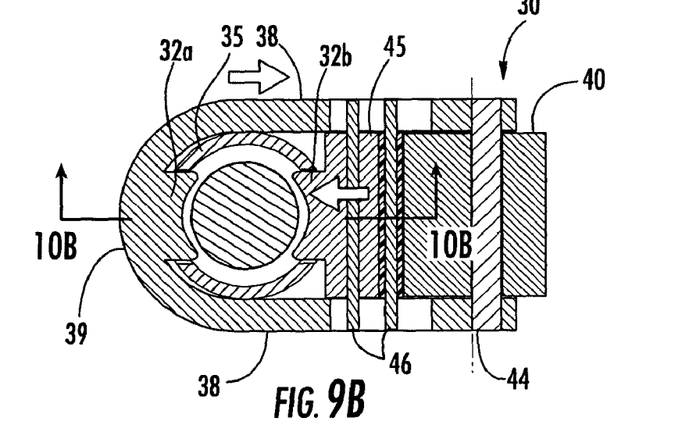
Figure 9C:
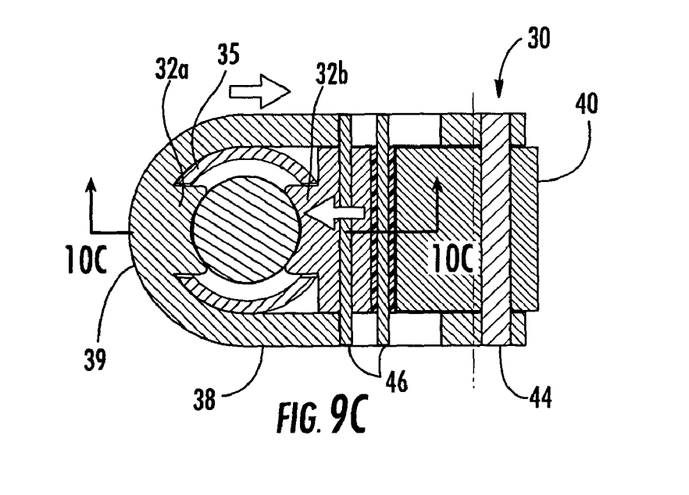
Figures 10A, 10B, 10C:
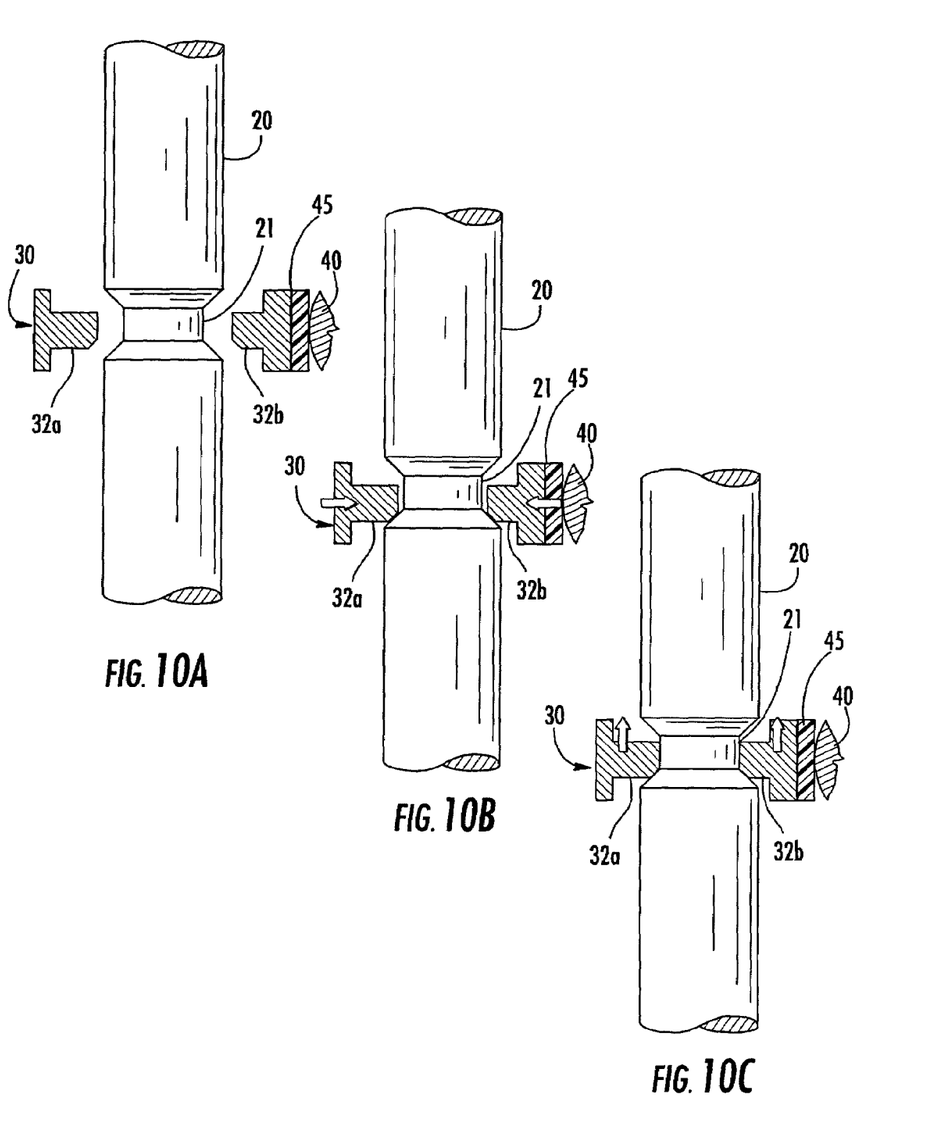
FIGS. 10A–10C are longitudinal cross-sectional views of the orifice tube beam lock shown in FIGS. 9A–9C taken through lines 10A—10A, 10B—10B, and 10C—10C, respectively.

Each of the drive members 20 illustratively has a recess 21 at the medial portion thereof. Each of the orifice tube beam locks 30 comprises key members 32a, 32b, and a lock handle 34 associated therewith. The lock handle 34 is moveable between a locked position (FIG. 8A) and an unlocked position (FIG. 8B). The lock handle 34 cooperates with the key members 32a, 32b to move the key members between a locked position, engaged within the recess 21 (FIG. 8A), and an unlocked position, disengaged from the recess (FIG. 8B).

Each drive member 20 comprises a stop 28 (FIG. 6) above the end of the orifice tube beam 24. The recess 21 and the key members 32a, 32b have cooperating inclined portions to preload the orifice tube beam 24 against the stop 28 when the key members are moved from the unlocked position to the locked position.

Figure 6:
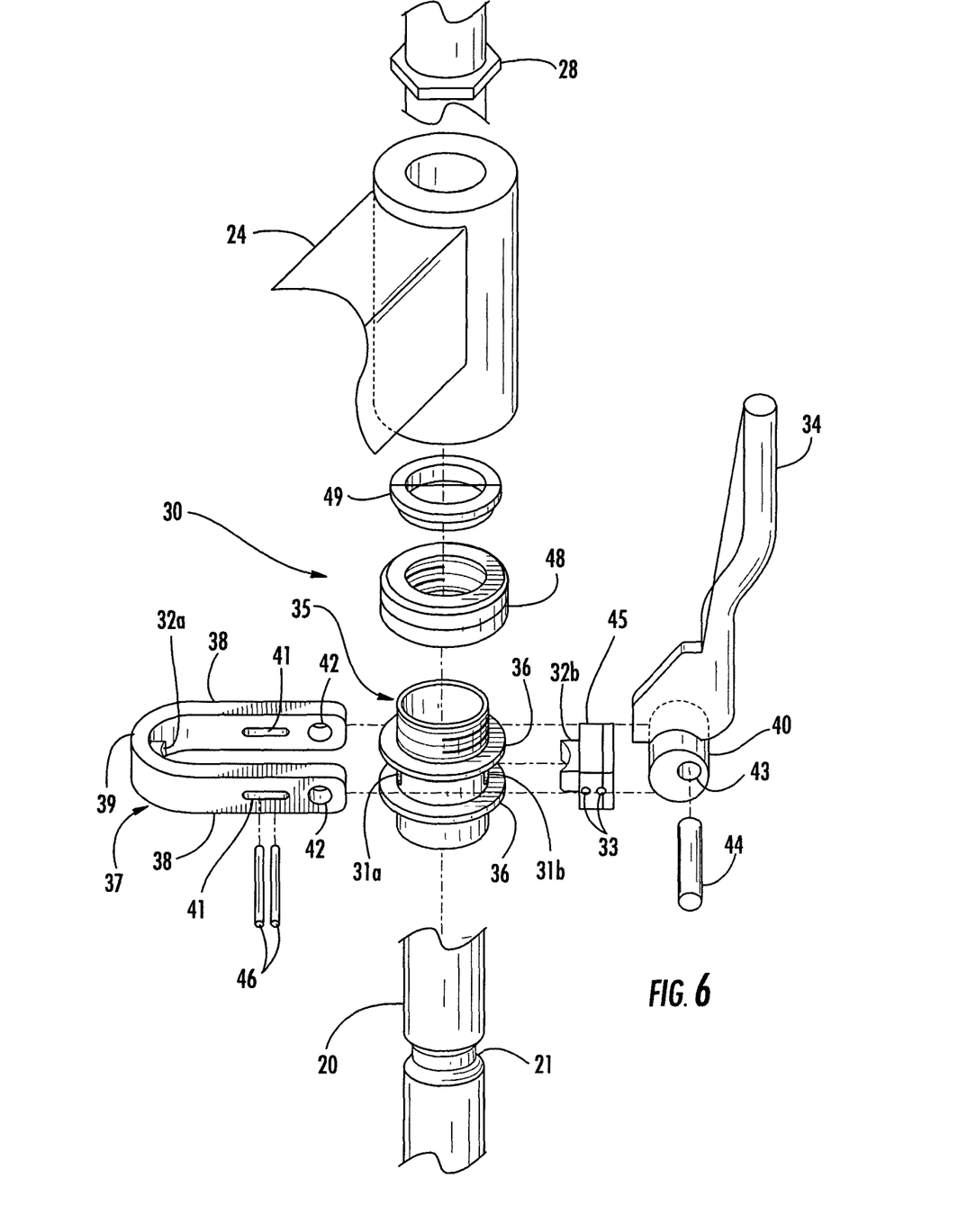
FIG. 6 is an exploded side perspective view of the orifice tube beam lock shown in FIG. 5.
Figure 7:
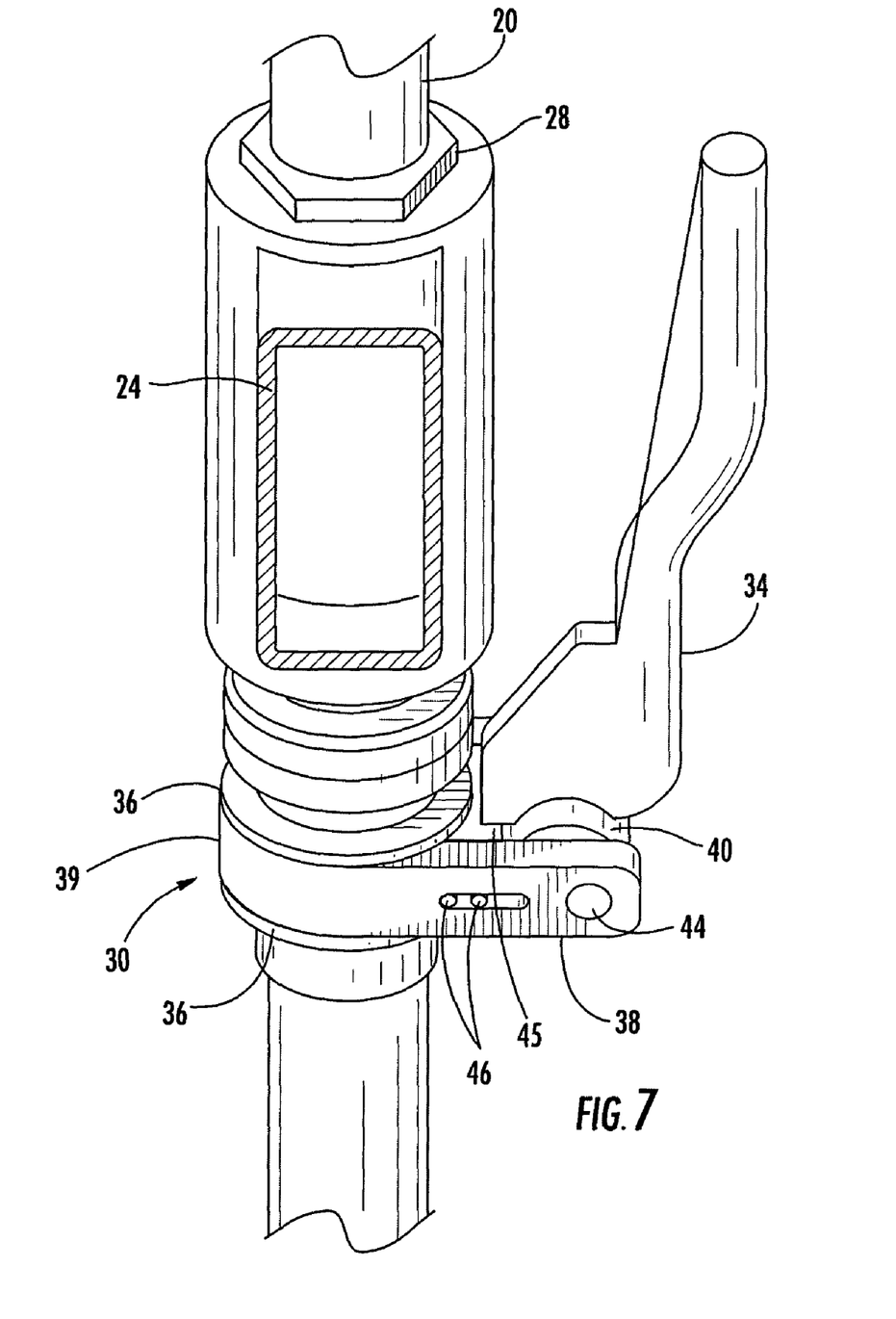
FIG. 7 is a fragmentary perspective view of a lock handle in the locked position adjacent an orifice tube beam lock of the juice extractor shown in FIG. 1.

The orifice tube beam lock 30 is now discussed in greater detail with reference to the exploded view illustrated in FIG. 6. and the cross sectional views illustrated in FIGS. 9A–10C. Each of the orifice tube beam locks 30 comprises a tubular body 35 surrounding the medial portion of a respective drive member 20. The tubular body 35 illustratively comprises a pair of spaced apart flanges 36 along a medial portion thereof. A pair of opposing key member passageways 31a, 31b are formed in a medial portion of the tubular body 35 between the flanges 36. The orifice tube beam locks 30 also illustratively comprise a U-shaped bracket 37 transversely slidable on the tubular body 35 and carrying a key member 32a.

The U-shaped bracket 37 comprises a pair of opposing legs 38 and a bight portion 39. The key member 32a is carried by an interior surface of the bight portion 39 of the U-shaped bracket 37 and engages the key member passageway 31a formed in the tubular body 35. The pair of opposing legs 38 slidably engage the tubular body 35 along a space defined by the spaced apart flanges 36.

The U-shaped bracket 37 also includes a bracket key-support member 45 that is connected between the legs 38 of the U-shaped bracket 37 opposite the bight portion 39. The bracket key-support member 45 carries a key member 32b that engages the key member passageway 31b formed in the tubular body 35. The bracket key-support member 45 further comprises a pair of pin receiving passageways 33 formed therein.

Likewise, each of the opposing legs 38 has a pin receiving passageway 41 formed therein for receiving a pair of pins 46. Accordingly, the pins 46 may be inserted through the pin receiving passageways 41 on the legs 38 of the U-shaped bracket 37 and through the pin receiving slots 33 on the bracket key-support member 45 to hold the key-support between the opposing legs of the U-shaped bracket.

A cam 40 is rotatably carried by the opposing ends of U-shaped bracket 37 and, more specifically, between the opposing legs 38 of the U-shaped bracket. The cam 40 is also illustratively connected to the lock handle 34. The U-shaped bracket 37 has a cam pin receiving passageway 42 formed in each of the opposing legs 38. Likewise, the cam 40 has a corresponding cam pin receiving passageway 43 formed therein. The cam 40 is fixed between the opposing legs 38 of the U-shaped bracket 37 by inserting a cam pin 44 through the respective cam pin receiving passageways 42, 43.

A spacer 48 is illustratively positioned on the tubular body 35 and between the orifice tube beam lock 30 and the orifice tube beam 24. This spacer 48 allows adjustment of the lock as will be appreciated by those skilled in the art. A collar 49 is illustratively fixed to an end of the orifice tube beam 24 adjacent the spacer 48.

A method aspect of the present invention is for selectively locking an orifice tube beam 24 in an operating position of a juice extractor 15. The method comprises selectively locking a pair of orifice tube beam locks 30 to medial portions of the drive members 20 to thereby selectively lock the orifice tube beam 24 in the operating position.

Another method aspect of the present invention is for moving an orifice tube beam 24 of a juice extractor 15 between a lower maintenance position and an upper operating position. The method comprises installing a lift assist 50 to the juice extractor 15, and grasping and raising the lift assist handle 58 to move the orifice tube beam 24 from the lower maintenance position to the upper operating position.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the dependent claims.

What is claimed is:

1. A juice extractor comprising:
   pairs of opposing cups being relatively movable for squeezing fruit therebetween;
   a pair of drive members extending along opposite sides of said pairs of opposing caps;
   a plurality of strainer tubes associated with respective pairs of opposing cups;
   an orifice tube beam having opposing ends slidable along medial portions of respective drive members;
   a plurality of orifice tubes extending from said orifice tube beam for reciprocal movement within respective strainer tubes; and
   a pair of orifice tube beam locks carried by the medial portions of said respective drive members for selectively locking said orifice tube beam to the medial portions of said respective drive members to prevent relative movement of said orifice tube beam along said respective drive members in both directions.

2. A juice extractor according to claim 1 wherein each of said drive members has a recess at a medial portion thereof; and wherein each of said orifice tube beam locks comprises at least one key member and a lock handle cooperating therewith for moving said at least one key member between a locked position engaged within the recess and an unlocked position disengaged from the recess.

3. A juice extractor according to claim 2 wherein each drive member further comprises a respective stop above the end of said orifice tube beam; and wherein the recess and said at least one key member have cooperating inclined portions to preload said orifice tube beam against the stop when said at least one key member is moved from the unlocked position to the locked position.

4. A juice extractor according to claim 2 wherein each of said orifice tube beam locks further comprises:
   a tubular body surrounding the medial portion of a respective drive member;
   a pair of spaced apart flanges carried by said tubular body;
   a U-shaped bracket transversely slidable on said tubular body between said flanges and carrying said at least one key member; and
   a cam rotatably carried by opposing ends of said U-shaped bracket and connected to said lock handle.

5. A juice extractor according to claim 1 further comprising at least one adjustable spacer associated with each orifice tube beam lock.

6. A juice extractor according to claim 1 further comprising:
   an end member connected between opposing ends of said pair of drive members; and
   a lift assist connected between said end member and said orifice tube beam for moving said orifice tube beam between a lower maintenance position and an upper operating position.

7. A juice extractor according to claim 6 wherein said lift assist comprises:
   a pair of hinges extending between said end member and said orifice tube beam; and
   at least one spring connected to said hinges to urge said orifice tube beam to the upper operating position.

8. A juice extractor according to claim 7 wherein each hinge comprises:
   a lower arm having a lower end pivotally mounted to said end member; and
   an upper arm having an upper end pivotally connected to said orifice tube beam and a lower end pivotally connected to a medial portion of said lower arm.

9. A juice extractor according to claim 8 wherein said lift assist further comprises a lift assist handle connected between upper ends of said lower arm.

10. A juice extractor comprising:
    pairs of opposing cups being relatively movable for squeezing fruit therebetween;
    a pair of drive members extending along opposite sides of said pairs of opposing cups;

a plurality of strainer tubes associated with respective pairs of opposing cups;

an orifice tube beam having opposing ends slidable along medial portions of respective drive members;

a plurality of orifice tubes extending from said orifice tube beam for reciprocal movement within respective strainer tubes;

an end member connected between opposing ends of said pair of drive members; and a lift assist connected between said end member and said orifice tube beam for moving said orifice tube beam between a lower maintenance position and an upper operating position, said lift assist comprising a pair of hinges extending between said end member and said orifice tube beam, at least one spring connected to said hinges to urge said orifice tube beam to the upper operating position, and a lift assist handle connected between medial portions of said pair of hinges.

11. A juice extractor according to claim 10 wherein each hinge comprises:

a lower arm having a lower end pivotally mounted to said end member; and an upper arm having an upper end pivotally connected to said orifice tube beam and a lower end pivotally connected to a medial portion of said lower arm.

12. A juice extractor according to claim 11 wherein said lift assist handle is connected between upper ends of said lower arm.

13. An orifice tube beam lock for a juice extractor comprising pairs of opposing cups; a pair of drive members extending along opposite sides of the cups, each drive member having a recess at a medial portion thereof; and an orifice tube beam having opposing ends slidable along medial portions of respective drive members, the orifice tube beam lock comprising:

a tubular body;

a bracket transversely slidable on said tubular body;

at least one key member carried by said bracket; and a lock handle carried by said bracket for moving said at least one key member between a locked position engaged within the recess and an unlocked position disengaged from the recess.

14. An orifice tube beam lock according to claim 13 wherein said bracket comprises a U-shaped bracket including a bight portion and a pair of legs extending outwardly therefrom.

15. An orifice tube beam lock according to claim 14 where said at least one key member comprises a first key member carried by the bight portion of the U-shaped bracket, and a second key member slidably carried between opposing legs of said U-shaped bracket.

16. An orifice tube beam lock according to claim 14 further comprising a cam rotatably carried by opposing ends of said U-shaped bracket and connected to said lock handle.

17. An orifice tube beam lock according to claim 13 wherein said at least one key member has an inclined portion that cooperates with an inclined portion of the recess to preload the orifice tube beam.

18. An orifice tube beam lock according to claim 14 further comprising a pair of flanges carried by said tubular body for retaining said U-shaped bracket thereon.

19. A lift assist for a juice extractor comprising pairs of opposing cups, a pair of drive members extending along opposite sides of the pairs of opposing cups, an orifice tube beam having opposing ends slidable along medial portions of respective drive members, and an end member connected between opposing ends of the pair of drive members, the lift assist for moving the orifice tube beam between a lower maintenance position and an upper operating position, the lift assist comprising:

a pair of hinges extending between the end member and the orifice tube beam;

at least one spring connected to said pair of hinges to urge the orifice tube beam to the upper operating position; and a lift assist handle connected between medial portions of said pair of hinges.

20. A lift assist according to claim 19 wherein each hinge comprises:

a lower arm having a lower end pivotally mounted to the end member; and an upper arm having an upper end pivotally connected to the orifice tube beam and a lower end pivotally connected to a medial portion of said lower arm.

21. A lift assist according to claim 20 wherein said lift assist handle is connected between upper ends of said lower arm.

* * * * *